United States Patent [19]

Wright et al.

[11] Patent Number: 5,000,039
[45] Date of Patent: Mar. 19, 1991

[54] MASS AIR FLOW INTEGRATOR

[75] Inventors: Danny O. Wright; Russell J. Wakeman, both of Newport News, Va.

[73] Assignee: Siemens-Bendix Automotive Electronics L.P., Troy, Mich.

[21] Appl. No.: 439,916

[22] Filed: Nov. 21, 1989

[51] Int. Cl.⁵ .......................................... G01M 15/00
[52] U.S. Cl. .................................................. 73/118.2
[58] Field of Search ................... 73/118.2, 204.18, 202, 73/202.5, 204.14, 861.18, 861.19, 861.27, 861.28, 861.42-861.46; 364/510

[56] References Cited

U.S. PATENT DOCUMENTS

| | | |
|---|---|---|
| 3,374,673 | 3/1968 | Trageser . |
| 3,433,069 | 3/1969 | Trageser . |
| 3,735,752 | 3/1973 | Rodder . |
| 4,083,244 | 4/1978 | Agar et al. . |
| 4,317,365 | 3/1982 | Lauterbach . |
| 4,363,238 | 0/1982 | William . |
| 4,372,166 | 2/1983 | Loveland ............... 73/861.28 |
| 4,403,506 | 9/1983 | Lauterbach . |
| 4,404,846 | 9/1983 | Yamauchi et al. ............ 73/204.18 |
| 4,433,576 | 2/1984 | Shih et al. . |
| 4,445,369 | 3/1984 | Stoltman et al. . |
| 4,448,070 | 5/1984 | Ohyama et al. . |
| 4,488,428 | 12/1984 | Taniuchi ............. 73/118.2 |
| 4,494,405 | 1/1985 | Oosuga et al. . |
| 4,555,937 | 12/1985 | Sumal ............... 73/204.18 |
| 4,587,844 | 5/1986 | Sumal . |
| 4,821,700 | 4/1989 | Weibler et al. ............... 73/118.2 |
| 4,841,938 | 6/1989 | Weibler et al. ............... 73/118.2 |
| 4,860,222 | 8/1989 | Schmidt et al. ............... 73/118.2 |

FOREIGN PATENT DOCUMENTS

| | | | |
|---|---|---|---|
| 0045413 | 3/1982 | Japan ............... | 73/861.28 |
| 0096516 | 4/1988 | Japan ............... | 73/118.2 |

OTHER PUBLICATIONS

K. H. Loesing, W. Jordan, H. Gerards, M. Henning, "Mass Air Flow Meter—Design and Application"; SAE-Paper 890779, 1989.

Primary Examiner—Robert Raevis
Attorney, Agent, or Firm—George L. Boller; Russel C. Wells

[57] ABSTRACT

Apparatus and method for integrating mass air flow for a specified cylinder event in the intake tract of an internal combustion engine. The respective outputs of a mass air flow sensor and a directional air flow sensor are used to determine an accurate net integrated value of mass air flow. The magnitude of mass air flow is sampled and electronically integrated several times during each specified engine event in either a positive or negative sense (depending upon air flow direction) to obtain a net mass air flow value, which is then input to a A/D converter and then a microprocessor in an engine electronic control unit for use in engine management control.

28 Claims, 7 Drawing Sheets

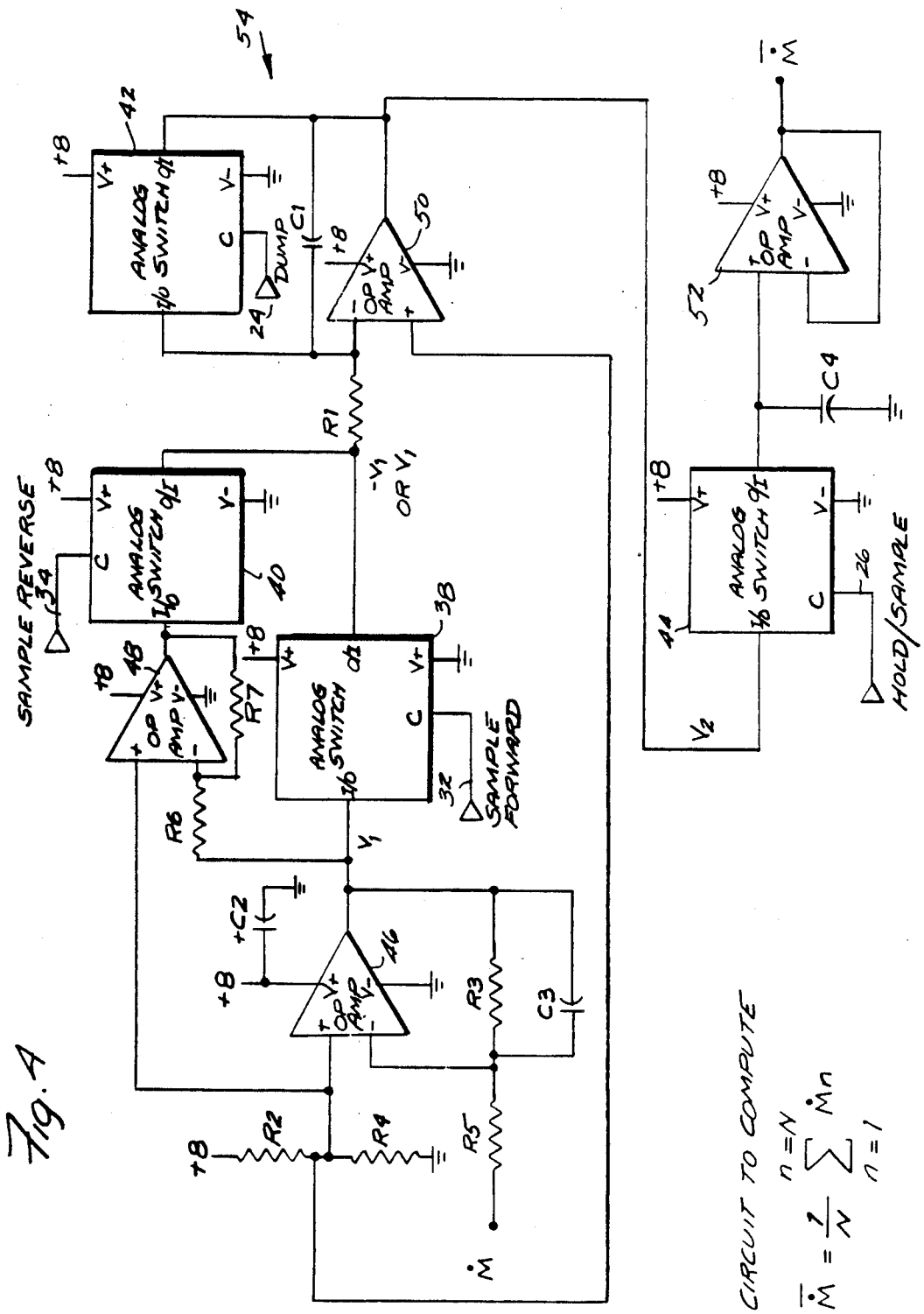

REVERSE FLOW
TO ENGINE

FORWARD FLOW

Fig. 6E
REVERSE FLOW
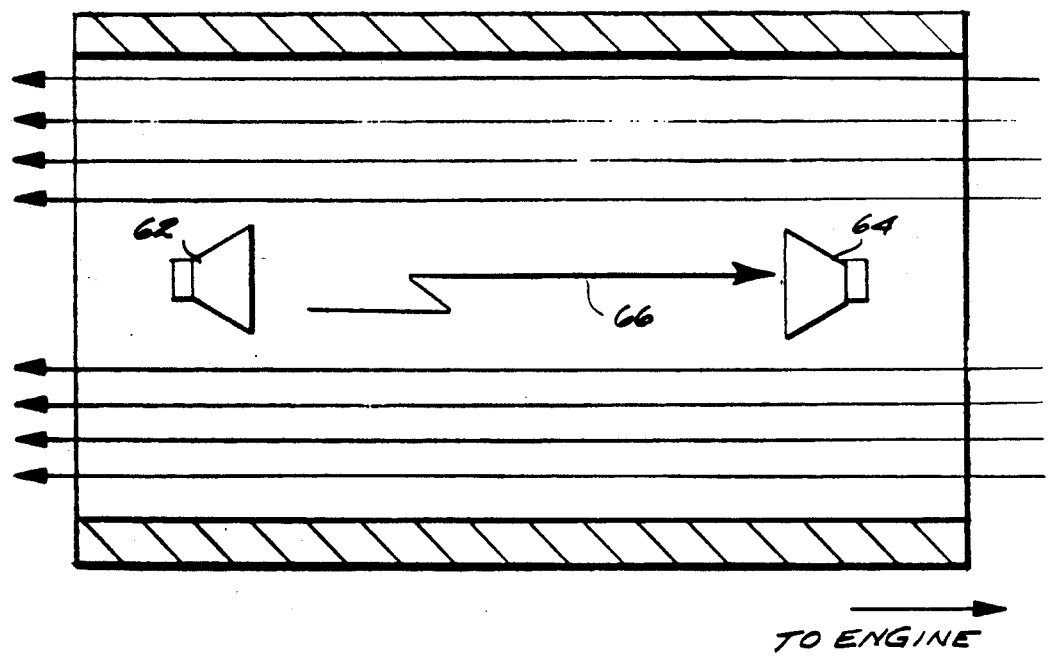
TO ENGINE
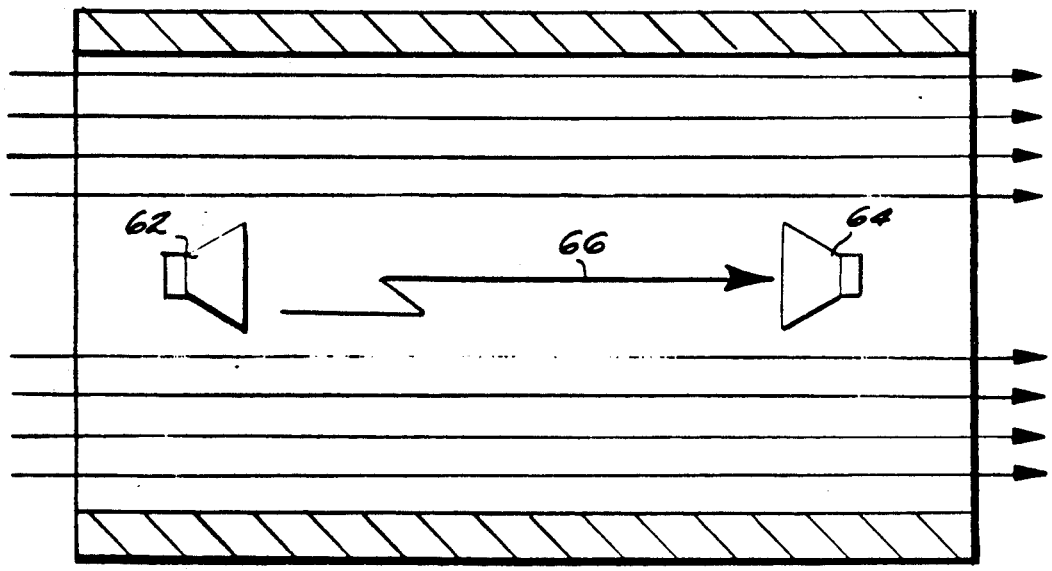
FORWARD FLOW
Fig. 6F

MASS AIR FLOW INTEGRATOR

BACKGROUND OF THE INVENTION

The field of the present invention is automotive engine management systems which use mass air flow sensors and, more particularly, mass air flow integration systems which use a mass air flow sensor.

Mass air flow sensors have often been used to measure load in automotive fuel and ignition control systems, as described in K. H. Loesing, W. Jordan, H. Gerards, M. Henning "Mass Air Flow Meter—Design and Application"; SAE-Paper 890779, 1989. These sensors have also found uses in other applications, including measuring the breath volume of patients. Some examples of typical sensor construction can be found in the following patents, which are herein incorporated by reference:

Trageser, U.S. Pat. Nos. 3,374,673 and 3,433,069.
Rodder, U.S. Pat. No. 3,735,752.
Agar et al, U.S. Pat. No. 4,083,244.
Lauterbach, U.S. Pat. Nos. 4,317,365 and 4,403,506.
William, U.S. Pat. No. 4,363,238.
Shih et al, U.S. Pat. No. 4,433,576.
Stoltman et al, U.S. Pat. No. 4,445,369.
Ohyama et al, U.S. Pat. No. 4,448,070.
Oosuga et al, U.S. Pat. No. 4,494,405.
Sumal, U.S. Pat. No. 4,587,844.

Some of these (e.g., William, U.S. Pat. No. 4,363,238 and Agar et al, U.S. Pat. No. 4,083,244) have included directionally sensitive flow rate sensors so as to distinguish between air flow directions. However, none appear to have utilized such sensed direction to control the sense of integration, thus providing a truly accurate net flow volume or mass in an environment where rapid flow variations are experienced (e.g., an engine intake tract).

In general, in the environment of engine intake tracts, mass air flow sensors have heretofor been capable of detecting variations in air flow due to production variations and/or aging of the engine. The sensors are usually calibrated for the fastest possible response so that they can adequately measure transients in the intake tract of the engine being operated. In actual practice, however, a fast response time can be a problem for analog-to-digital converters which read the voltage from the sensors for use as an input to the engine electronic control unit.

The output of the sensor is typically sampled at particular points in the engine cycle so that every cylinder has a recent flow reading. This reading is often used as if it were a direct representation of the mass of air inducted during a particular cylinder event. (A particular cylinder event can be defined, for example, as the period between ignition frequency pulses which, of course, would vary with the number of cylinders.)

However, the air flow into the engine is not steady. It has a waveform which is related to valve events, piston speed, the acoustics of the intake manifold and, if applicable, variations in valve timing with engine r.p.m. If the waveform which represents the mass air flow rate is sampled at the same particular crank angle regardless of engine r.p.m. and engine operating conditions, the result will be that the sample will be taken at different points in the waveform as the engine speed varies. This situation becomes multi-dimensionally difficult if valve timing is capable of variation.

Several solutions have been proposed in the prior art which address this drawback. The simplest solution is to simply slow the sensor's meter response time so that a sample taken at a given point in time represents more of an average of the waveform over the cycle. This solution suffers from poor transient response. However, most systems attempt to compensate errors created by point sampling of the mass air flow sensor by use of an oxygen sensor control feedback loop to compensate for systematic errors caused by air flow sensing inaccuracies. This can be done by using cartography based on engine operating conditions to look up a compensation factor to correct the sensor reading.

A better solution, embodied in the present invention, is to use a sampling scheme which reads a fast response mass air flow sensor meter in such a way that the result of the readings represents the total net mass of air passing the meter during a specified cylinder event. In this way, fast transient response is not compromised to gain accuracy of the meter reading. This method requires that enough samples be taken at fixed crank angle intervals during a cylinder event so that the waveform is accurately represented by the resulting single summed or integrated final net value. In this way, variations in air flow caused by changing acoustics, valve events, valve timing aging or production tolerances can be automatically compensated.

In general, mass air flow sensors used to sample mass air for engine control are of the hot element anemometer type, which read mass air flow directly. Since the sensing elements in the meter of such a sensor typically are symmetrical with respect to direction of flow, mass air flow is read without regard to the direction of air flow. This makes the typical integrated flow meter signal inaccurate since only the forward flow minus the reverse flow results in the true or net flow into the engine. A hot element mass flow sensor by itself, even with an integration circuit, necessarily has the reverse flow added positively to the forward flow, thus giving a reading far larger than the actual correct net flow reading.

SUMMARY OF THE INVENTION

The exemplary embodiments of the present invention provide a mass air flow integrator which takes into account forward and reverse flow as it computes a true net mass air flow value for a given cylinder event. To this end, according to the invention, a mass air flow integrator is provided in which a mass air flow sensor and a directional air flow sensor are both provided in the intake tract of an engine. This allows the integrator to produce a correct net value of mass air flow. A microprocessor from an engine's electronic control unit samples the directional air flow many times per cylinder event and an electronic analog circuit uses those summed values to generate a cumulative net sum, which is then input via an analog-to-digital converter to the microprocessor once every cylinder event.

The above and other objects, features and advantages of the present invention will become clear from the following description of the preferred embodiments of the invention taken in conjunction with the accompanying drawings.

BRIEF DESCRIPTION OF THE DRAWINGS

FIG. 4 is a schematic diagram of the integration circuit of the present invention;

FIG. 6E is a sectional view of the respective locations of the transmitter and receiver and direction of the acoustic wave in the third exemplary embodiment of the present invention in reverse air flow;

FIG. 6F is a sectional view of the locations of the transmitter and receiver and the direction of the acoustic wave of the third exemplary embodiment of the present invention in forward air flow.

DETAILED DESCRIPTION OF THE PREFERRED EMBODIMENTS

Figure 1:
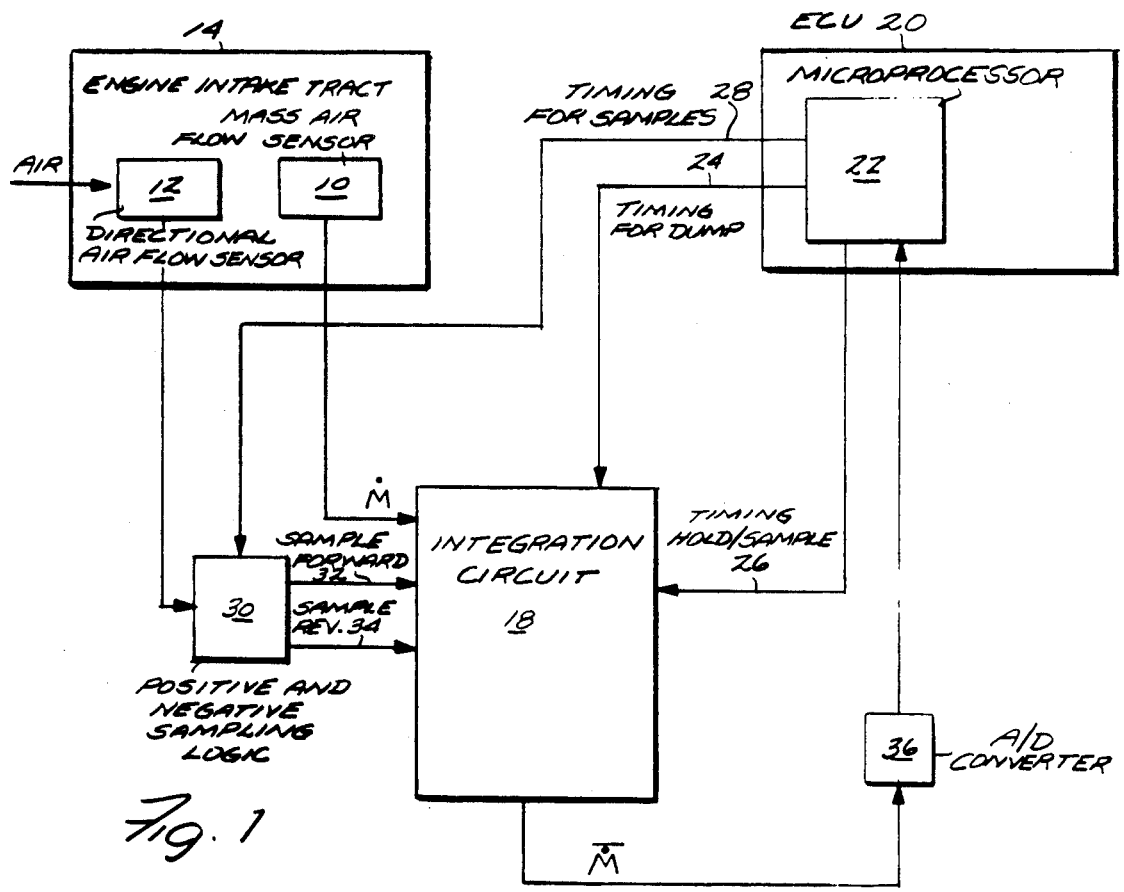
FIG. 1 is a block diagram of the elements of the present invention.
Figure 3:
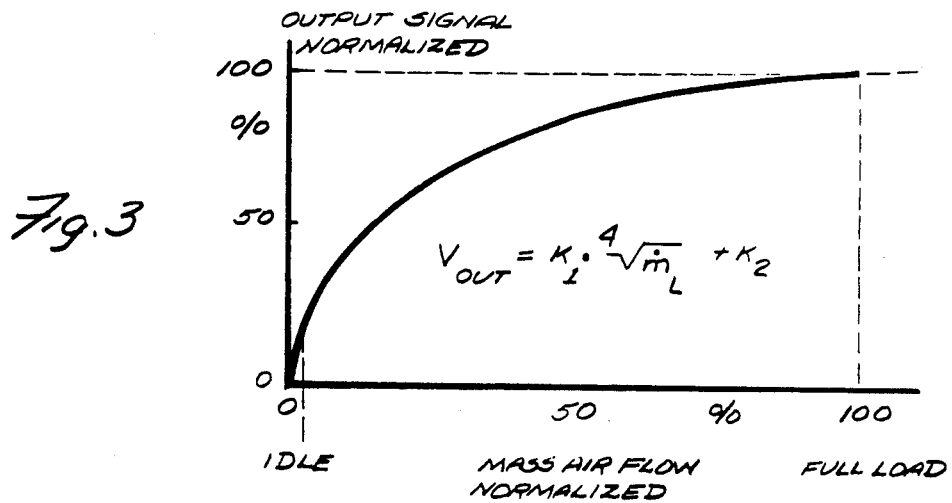
FIG. 3 is a plot of normalized output vs. normalized mass air flow for a typical mass air flow sensor.

Referring to FIG. 1, a mass air flow sensor 10 and a directional air flow sensor 12 are located in the intake tract 14 of an internal combustion engine (not shown). The characteristic output function of a typical mass air flow sensor is shown in FIG. 3, where the output signal increases with the mass air flow according to the formula $$V_{out} = k_1 \cdot \sqrt[4]{m_L} + k_2$$

where $V_{out}$ is the output voltage, $k_1$ and $k_2$ are constants, and $m_L$ is the mass air flow. In the preferred embodiment, the mass air flow sensor 10 and the directional air flow sensor 12 of the present invention both have a similar construction.

Referring back to FIG. 1, the output M of the mass air flow sensor 10 is input to the integration circuit 18. The electronic control unit (ECU) 20 contains the microprocessor 22, which has two inputs to the integration circuit 18, a dump timing line 24, and a hold/sample timing line 26. The microprocessor 22 also has a sample timing line 28 input to the positive and negative sampling logic 30. The positive and negative sampling logic 30 receives another input from the output of the directional air flow sensor 12. The positive and negative sampling logic 30 sends an output along either sample forward line 32 or sample reverse line 34 to the integrator circuit 18, and the integration circuit 18 sends an output M to an A/D converter 36. The A/D converter 36 sends a digital representation of M to the microprocessor 22, which processes the information for use in the ECU 20 for engine management control.

The positive and negative sampling logic 30 detects a forward mass air direction and, in response, activates the sample forward line 32. A reverse mass air direction activates the sample reverse line 34, via conventionally derived logic circuits.

Figure 7:
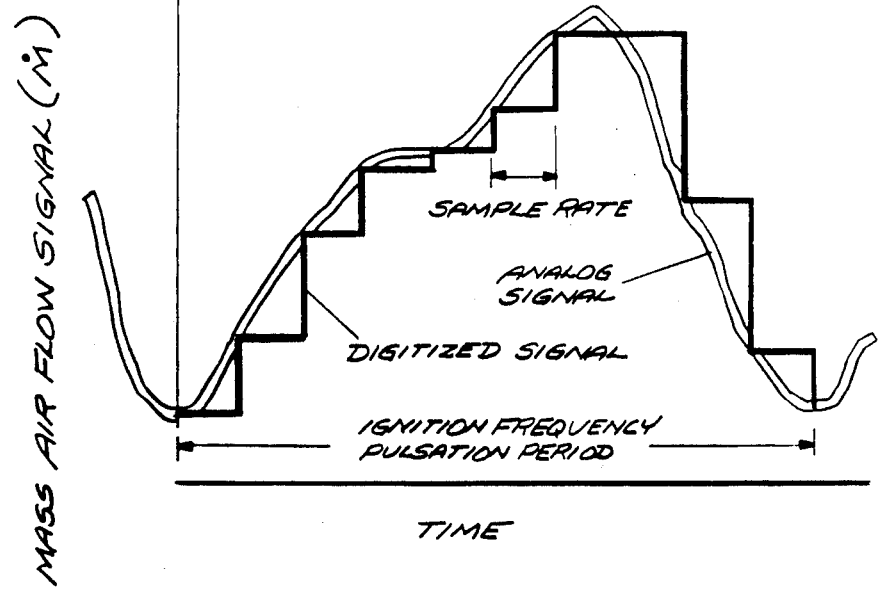
FIG. 7 is a typical plot of the sampled signal of a typical mass air flow sensor vs. time.

The integration circuit 18 is schematically shown in FIG. 4. It is used to perform an integration of mass air flow M over a specified engine event. In the preferred embodiment, that event is the ignition frequency pulsation period, as shown in FIG. 7. In a 4-cylinder engine, such event may have a duration of 720°/4 or 180°, where 720° is the duration, in crankshaft revolution degrees, of an ignition frequency pulsation period for a single cylinder 4-cycle engine.

The circuit performs the operational computation:

$$M = \frac{1}{N} \sum_{n=1}^{n=N} M_n$$

where, $M_n$ = a sample of mass air flow output from the positive and negative sampling logic 30

N = the number of samples and

M is the net mass air flow value.

In the preferred exemplary embodiment, microprocessor 22 causes samples to be taken every degree of crankshaft revolution; and, in a 4-cylinder engine, as noted above, there are 180° and, therefore, N = 180 samples per engine event. For, say a 6-cylinder engine, there would be 720/6, or 120° per engine event, and 120 samples would be taken per engine event.

For every engine event, a net mass air flow value M is input to the A/D converter 36, and then a digitized version of M is input to the microprocessor 22 for use in the ECU 20 for engine management control. The integration circuit 18 is then reinitialized to calculate another M value for a succeeding engine event.

As shown in FIG. 4, analog switches 38, 40, 42 and 44, and four operational amplifiers ("Op Amps") 46, 48, 50, 52 are powered by an 8 volt external power supply (not shown). Resistors R2 and R4 divide the power supply voltage of 8 volts in half and thus hold 4 volts at the positive input of Op Amp 46. Op Amp 46, along with capacitors C2 and C3 and resistors R5 and R3, make up a low pass filter with a 3 dB frequency of 10 Hz and a 6 dB/octave slope.

The Op Amp 46 accepts a conventionally generated M signal, which is in the range of 1-6 volts D.C., and converts it to voltage $V_1$, which is fed to the analog switch 38. When sample forward line 32 is activated, switch 38 closes to allow the filtered voltage $V_1$ to appear at resistor $R_1$. On the other hand, if sample reverse line 34 is activated instead, analog switch 38 is opened and the analog switch 40 is closed. This allows the filtered output $-V_1$ generated by Op Amp 48 (and associated resistors $R_6$ and $R_7$) to appear at resistor $R_1$. The integration capacitor $C_1$ across the Op Amp 50 stores $V_1$ or $-V_1$ and accumulates it. When dump line 24 is activated, capacitor $C_1$ is discharged and the integrated sample voltage $V_2$ is presented to analog switch 44. When hold/sample line 26 is set to hold, integrated voltage $V_2$ is fed to unity gain Op Amp 52 from which it is output to A/D converter 36 as the net air mass M (fed in digital format to the microprocessor 22 in ECU 20).

Figure 5:
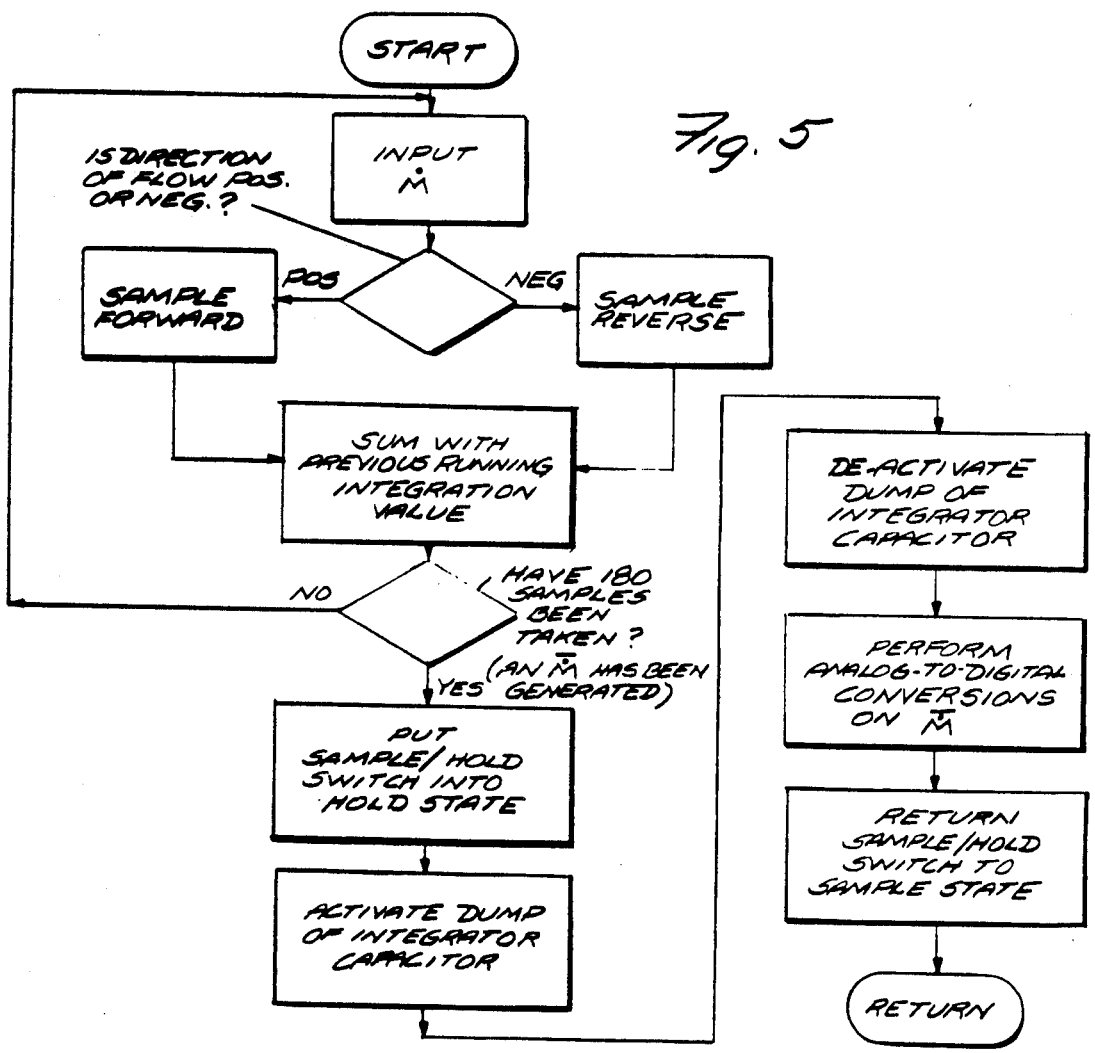
FIG. 5 is a flow chart of the steps performed by the present invention.
Figure 8:
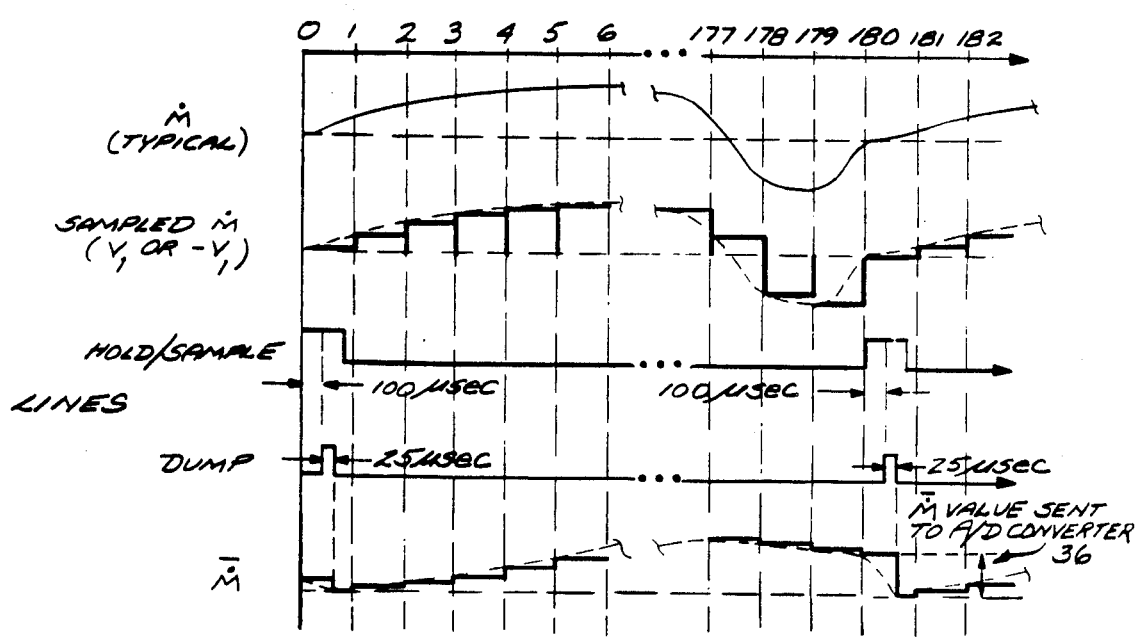
FIG. 8 is a typical timing diagram of the various inputs and outputs to the integration circuit of the present invention.

Referring to the flowchart of FIG. 5 and the timing diagram of FIG. 8, the generation of each value of M, as stated above, is based on a specified cylinder event. This event may be an ignition frequency pulsation period, which is triggered by a Fuel Timing Pulse (FTP)(not shown) interrupt in the fuel system electronic control unit (ECU) 20 microprocessor 22. The FTP interrupt is a hardware signal that has a constant angular relationship with top dead center (TDC) for a given cylinder, i.e., the FTP occurs 115 crank degrees before TDC. There is one FTP for each TDC.

The first logic action undertaken when M has been generated is to place the hold/sample switch 26 into a hold state—that is, the switch is opened. The voltage at that time is held by analog-to-digital (A/D) converter 36 as input to the ECU microprocessor 22.

100 microseconds later the capacitor in the analog integrator is then "dumped" by closing dump switch 42 (as controlled by a suitable microprocessor 18 output), effecting a resetting short circuit of capacitor $C_1$. After approximately 25 microseconds, dump switch 42 is reopened. This procedure allows for reinitialization of analog integrator 54.

While hold/sample switch 44 is opened, the final integration value is at the input of A/D converter 36 and microprocessor 22 reads the integrated digitized voltage. Upon completion of such reading process, the hold/sample switch 44 is returned to the sample state (closed), allowing input to the A/D converter 36 to fluctuate with the signal being next integrated until the next time hold/sample switch 44 is opened.

The timing diagrams of FIG. 7 and FIG. 8 illustrate an exemplary relationship between the analog and sampled digital mass air flow M, hold/sample line 26, dump line 24 and integrated mass air flow value M.

In particular, FIG. 7 depicts a general relationship between the analog mass air flow signal M and the sampling procedure for a given cylinder event, where the analog signal is sampled and each particular sampled value is held constant until the next sample is taken.

FIG. 8 schematically illustrates several waveforms present in an exemplary embodiment. M varies in magnitude and direction for every cylinder event with an irregular waveform which depends upon valve events, piston speed, the acoustics of the intake manifold, variations in valve timing and engine R.P.M., as discussed above. A cylinder event in the present invention is represented by an ignition frequency pulsation period of 180° crankshaft degrees for a 4 cylinder engine, for example. The mass air flow M is sampled and the sample value is held for each degree of crankshaft revolution. The positive and negative sampling logic 30 determines whether a negative or positive sample is being taken, depending on air flow direction. After every set of 180° samples are take, hold/sample line 26 is placed in the "hold" state just long enough (100 μsec) so that the integrated mass air value M can be "dumped" to A/D converter 36 and onto microprocessor 22 for engine management.

The integration circuit 18 is then reinitialized to a value of M=0 to begin the process for the next cylinder event (180° per ignition frequency pulsation period for a 4 cylinder engine).

Figure 2:
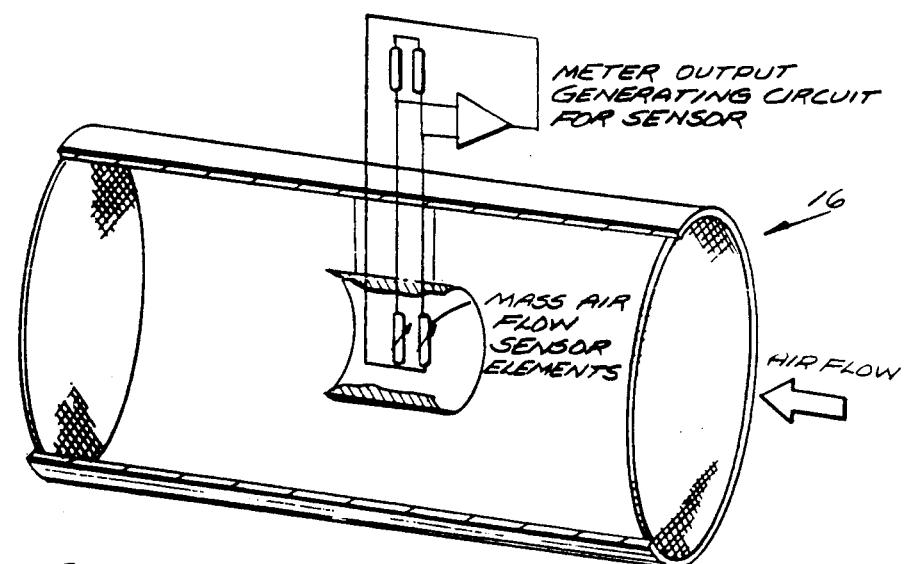
FIG. 2 is a sectional view of a flow cross section of a typical hot element anemometer type of mass air flow sensor.
Figure 6A:
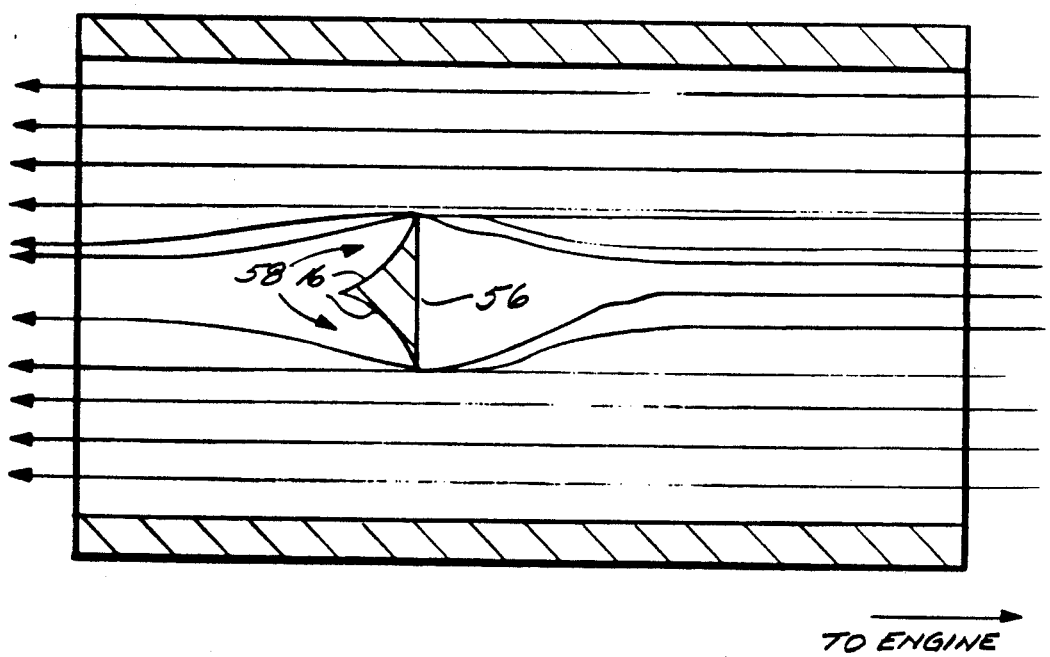
FIGS. 6A and 6C are sectional views of the bluff body and sensor locations for the first two exemplary embodiments of the present invention in a reverse air flow.
Figure 6B:
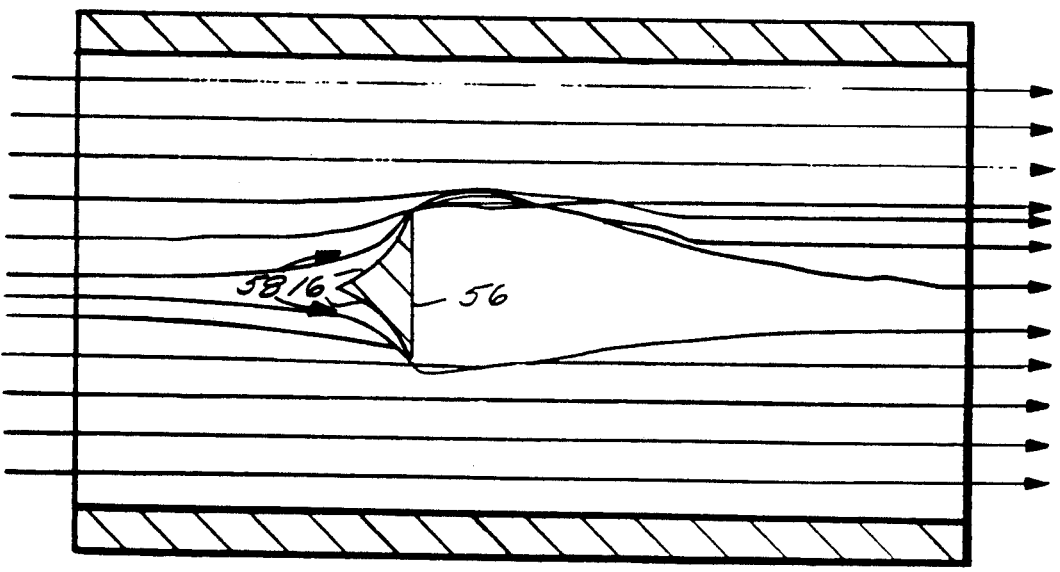
FIGS. 6B and 6D are sectional views of the bluff body and sensor locations for the first two exemplary embodiments of the present invention in a forward air flow.

In a preferred embodiment, mass air flow direction is determined by a hot element anemometer sensor 16 is placed on a triangularly shaped bluff body 56, both located in the airstream of the intake tract 14, as depicted in FIGS. 6A and 6B. A typical hot element anemometer type 16 shown in FIG. 2. The sensor 16 may be placed, for example, on a leading side of the bluff body 56 oriented with one vertex upstream in the forward flow of the airstream.

The triangular cross section body disposed across the air passage of the flowmeter will have the flow directed over it. In the forward direction (FIG. 6B), the relatively high rate heat conduction in this condition will be an indication to the positive and negative sampling logic 30. In the reverse direction (FIG. 6A), because of the sharp-edged shape of the bluff body 56, flow will separate around the obstruction. Since the flow will then create a low-velocity separation region 58, the heat conducted out of the hot element 16 will be much less, indicating that the flow has reversed direction to the positive and negative sampling logic 30.

Figure 6C:
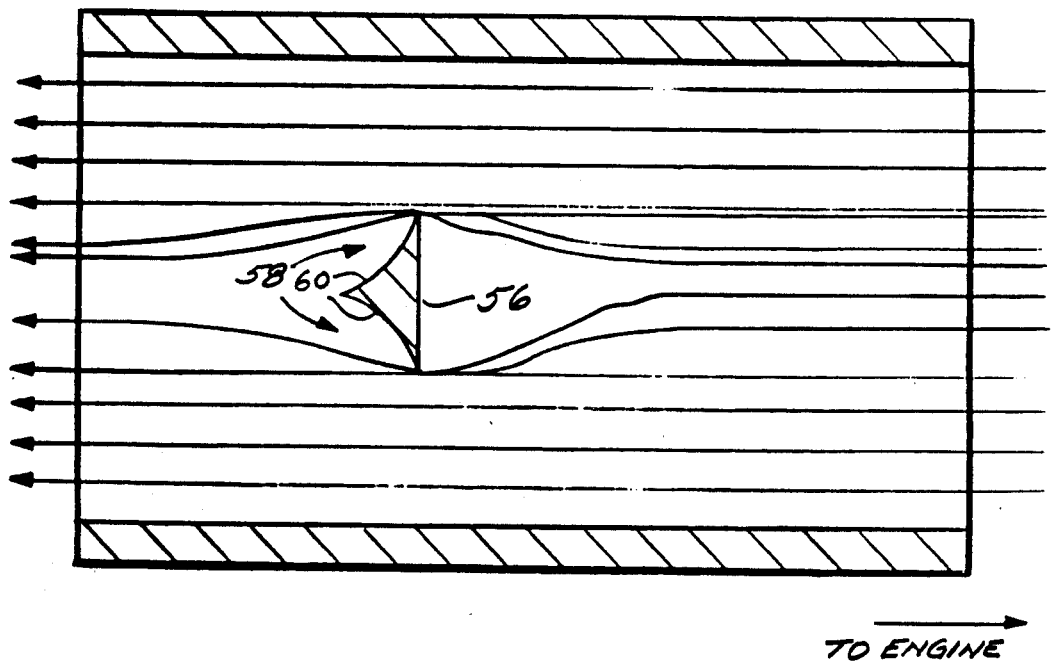
Figure 6D:
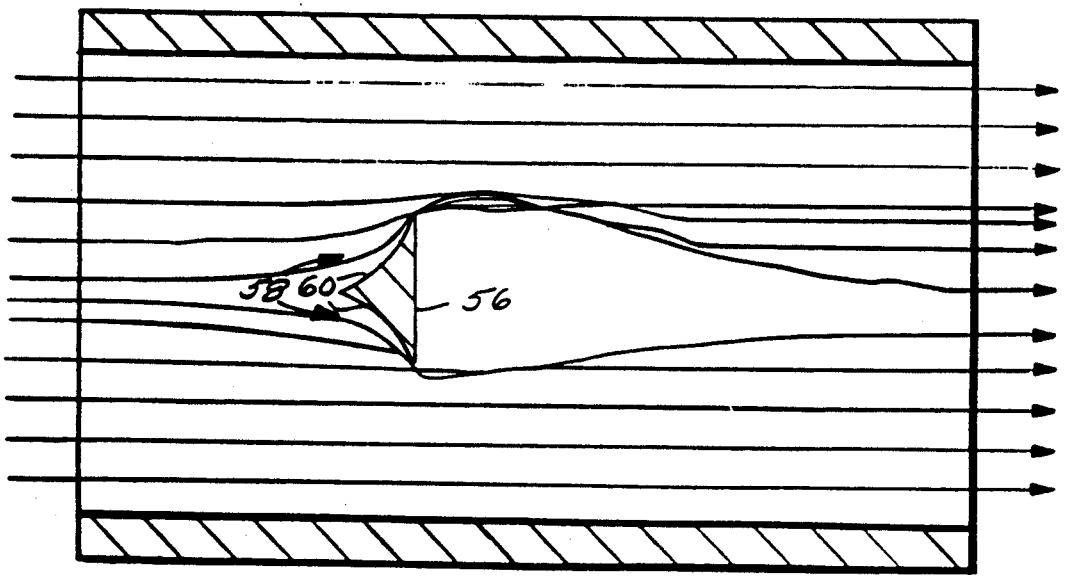

In a second exemplary embodiment of the invention, as shown in FIGS. 6C and 6D, a pressure sensor 60 with its sensing port located in the same separation region 58 on the bluff body 56 may also detect reverse flow (i.e., a lowered pressure detection). In the forward direction (FIG. 6D), the pressure read by the sensor 16 will be the stagnation pressure of the forward flow. In the reverse direction (FIG. 6C), with the pressure sensing part in the separation region 58 the pressure will be sharply lower, indicating reverse flow.

In a third exemplary embodiment of the invention, as shown in FIGS. 6E and 6F, an ultrasonic transmitter 62 and a receiver 64 are placed in the flow stream to sense flow direction. The time for an acoustic wave 66 to go from the transmitter to the receiver is a function of the sum of the speed of sound added vectorially to the flow velocity. If the transmitter is installed in forward flow upstream from the receiver, as shown in FIG 6F, the apparent speed of sound will be greater than the actual speed. If the flow velocity reverses as in FIG. 6E, the apparent speed will be less than the actual speed by the amount of the flow velocity. In this way, this Doppler frequency/phase shift between the transmitted wave and the received wave can be used to determine the velocity and direction of the flow.

With any means of generating a signal representative of the flow direction, the integrator 54 can be made to subtract the reverse flow measurement by means of positive and negative sampling logic 30 and thus determine the true net mass flow into the engine.

Manifold Absolute pressure (MAP) sensor sampling can also be improved with the integrator of the present invention. In a speed density system, the MAP sensor is also sampled at a fixed crankshaft angle, and the manifold pressure wave form varies with engine speed because it is a function of the speed of sound and the acoustic distances traversed in the manifold rather than engine speed. If the pressure (as an indication of charge density) is sampled at a specific crank angle it will be related to the RMS pressure (and so the average charge density) in a manner that must be carefully mapped at each point of engine operation. An integration method of sampling the pressure gives a better representation of the true charge inducted. This enables better open-loop fuel precision over the life of the engine and over the range of production tolerances that could not be mapped in the calibration process.

While the invention has been described in connection with presently preferred exemplary embodiments, it is to be understood that the invention is not limited to the disclosed embodiments, but on the contrary, includes various modifications and equivalent arrangements included within the spirit and scope of the appended claims.

What is claimed is:

1. Apparatus means for repeatedly updating an ECU of an internal combustion engine with a measurement of the net mass of combustion air entering the engine during each occurrence of a recurring interval which is measured by rotation of a crankshaft of the engine through a number of mechanical degrees which correspond to the execution of a particular stroking of a piston within a cylinder of the engine and within which the combustion air flow is at some times directionally into the engine and at other times directionally out of the engine, said means comprising:

a first sensing means disposed in sensing a relation to the combustion air flow and providing an analog signal measurement of the instantaneous mass flow rate of the passing air flow without distinguishing between flow which is directionally into the engine and flow which is directionally out of the engine;

a second sensing means disposed in relation to said first sensing means and in sensing relation to the combustion air flow to provide a directional signal which is indicative of whether the instantaneous air flow past said first sensing means is directionally into the engine or directionally out of the engine;

means sampling the analog signal measurement provided by said first sensing means at each of a plurality of selected sample occasions during one of said intervals;

means comprising a single accumulator which at any instant of time during said one of said intervals contains a value representing the net mass of air that has entered the engine so far during said one of said intervals, said accumulator comprising means accumulating over said one of said intervals the result of integrating each sample of the analog signal measurement over a segment of said one of said intervals defined by a pair of immediately consecutive ones of said selected sample occasions, one of which pair of occasions includes the particular sample being integrated, such that when the directional signal of said second sensing means indicates flow that is directionally into the engine, integration is conducted in one sense, and when the directional signal of said second sensing means indicates flow that is directionally out of the engine, the integration is conducted in an opposite sense; and means providing to the engine ECU, at the conclusion of said one of said intervals, the value contained in said accumulator, namely the accumulated result of the integrations so conducted.

2. Apparatus means as set forth in claim 1 wherein said means sampling the analog signal measurement provided by said first sensing means at each of a plurality of selected sampling occasions during one of said intervals comprises means sampling the analog signal measurement at selected sampling occasions which are at equal increments of crankshaft rotation along said one of said intervals.

3. Apparatus means as set forth in claim 2 wherein said means sampling the analog signal measurement at selected sampling occasions which are at equal increments along said one of said intervals comprises means sampling the analog signal measurement at selected sampling occasions which are at one degree increments of crankshaft rotation along said one of said intervals.

4. Apparatus means as set forth in claim 3 wherein said means accumulating over said one of said intervals the result of integrating each sample of the analog signal measurement taken during said one of said intervals over a segment of said interval defined by a pair of immediately consecutive ones of said selected sample occasions comprises means integrating each sample of said analog signal measurement over a segment of one degree of crankshaft rotation.

5. Apparatus means as set forth in claim 1 wherein the beginning of an occurrence of said recurring interval is coincident with the ending of an immediately preceding occurrence of said recurring interval.

6. Apparatus means as set forth in claim 1 wherein said recurring interval, for a four-stroke engine, possesses a measurement equal to 720/N degrees of crankshaft rotation, where N is the number of cylinders of the engine.

7. Apparatus means as set forth in claim 1 wherein said recurring interval has a measurement equal to the number of degrees of crankshaft rotation that correspond to the execution of a single stroke of a piston within a cylinder of the engine.

8. Method for repeatedly updating an ECU of an internal combustion engine with a measurement of the net mass of combustion air entering the engine during each occurrence of a recurring interval which is measured by rotation of a crankshaft of the engine through a number of mechanical degrees which correspond to the execution of a particular stroking of a piston within a cylinder of the engine and within which the combustion air flow is at some times directionally into the engine and at other times directionally out of the engine, said method comprising:

generating, by means of a first sensing means disposed in sensing relation to the combustion air flow, an analog signal measurement of the instantaneous mass flow rate of the passing air flow without distinguishing between flow which is directionally into the engine and flow which is directionally out of the engine;

generating, by means of a second sensing means disposed in relation to said first sensing means and in sensing relation to the combustion air flow, a directional signal which is indicative of whether the instantaneous air flow past said first sensing means is directionally into the engine or directionally out of the engine;

sampling the analog signal measurement provided by said first sensing means at each of a plurality of selected sample occasions during one of said intervals;

accumulating in a single accumulator over said one of said intervals the result of integrating each sample of the analog signal measurement over a segment of said one of said intervals defined by a pair of immediately consecutive ones of said selected sample occasions, one of which pair of occasions includes the particular sample being integrated, such that when the directional signal of said second sensing means indicates flow that is directionally into the engine, integration is conducted in one sense, and when the directional signal of said second sensing means indicates flow that is directionally out of the engine, the integration is conducted in an opposite sense, said accumulator thereby being caused to contain at any instant of time during said one of said intervals a value representing the net mass of air that has entered the engine so far during said one of said intervals; and providing to the engine ECU, at the conclusion of said one of said intervals, the value contained in said accumulator, namely the accumulated result of the integrations so conducted.

9. Method as set forth in claim 8 wherein sampling the analog signal measurement provided by said first sensing means at each of a plurality of selected sampling occasions during one of said intervals comprises sampling the analog signal measurement at selected sampling occasions which are at equal increments of crankshaft rotation along said one of said intervals.

10. Method as set forth in claim 9 wherein sampling the analog signal measurement at selected sampling occasions which are at equal increments along said one of said intervals comprises sampling the analog signal measurement at selected sampling occasions which are at one degree increments of crankshaft rotation along said one of said intervals.

11. Method as set forth in claim 10 wherein accumulating over said one of said intervals the result of integrating each sample of the analog signal measurement taken during said one of said intervals over a segment of said interval defined by a pair of immediately consecutive ones of said selected sample occasions comprises integrating each sample of said analog signal measurement over a segment of one degree of crankshaft rotation.

12. Method as set forth in claim 8 wherein the beginning of an occurrence of said recurring interval is coincident with the ending of an immediately preceding occurrence of said recurring interval.

13. Method as set forth in claim 8 wherein said recurring interval, for a four-stroke engine, possesses a measurement equal to 720/N degrees of crankshaft rotation, where N is the number of cylinders of the engine.

14. Method as set forth in claim 8 wherein said recurring interval has a measurement equal to the number of degrees of crankshaft rotation that correspond to the execution of a single stroke of a piston within a cylinder of the engine.

15. Apparatus means for repeatedly updating an ECU of an internal combustion engine with a measurement of the net mass of combustion air entering the engine during each occurrence of a recurring interval which is measured by rotation of a crankshaft of the engine through a number of mechanical degrees which correspond to the execution of a particular stroking of a piston within a cylinder of the engine and within which the combustion air flow is at some times directionally into the engine and at other times directionally out of the engine, said means comprising:

a first sensing means disposed in sensing relation to the combustion air flow and providing an analog signal measurement of the instantaneous mass flow rate of the passing air flow without distinguishing between flow which is directionally into the engine and flow which is directionally out of the engine;

a second sensing means disposed in relation to said first sensing means and in sensing relation to the combustion air flow to provide a directional signal which is indicative of whether the instantaneous air flow past said first sensing means is directionally into the engine or directionally out of the engine;

means sampling the analog signal measurement provided by said first sensing means at each of a plurality of selected sample occasions during one of said intervals;

means comprising a single accumulator which at any instant of time during said one of said intervals contains a value representing the net mass of air that has entered the engine so far during said one of said intervals, said accumulator comprising means accumulating over said one of said intervals the result of integrating each sample of the analog signal measurement taken over a corresponding segment of said one of said intervals such that when the directional signal of said second sensing means indicates flow that is directionally into the engine, integration is conducted in one sense, and when the directional signal of said second sensing means indicates flow that is directionally out of the engine, the integration is conducted in an opposite sense; and means providing to the engine ECU, at the conclusion of said one of said intervals, the value contained in said accumulator, namely the accumulated result of the integrations so conducted.

16. Apparatus means as set forth in claim 15 wherein said means sampling the analog signal measurement provided by said first sensing means at each of a plurality of selected sampling occasions during one of said intervals comprises means sampling the analog signal measurement at selected sampling occasions which are at equal increments of crankshaft rotation along said one of said intervals.

17. Apparatus means as set forth in claim 16 wherein said means sampling the analog signal measurement at selected sampling occasions which are at equal increments along said one of said intervals comprises means sampling the analog signal measurement at selected sampling occasions which are at one degree increments of crankshaft rotation along said one of said intervals.

18. Apparatus means as set forth in claim 17 wherein said means accumulating over said one of said intervals the result of integrating each sample of the analog signal measurement taken over a corresponding segment of said one of said intervals comprises means integrating each sample of said analog signal measurement over a segment of one degree of crankshaft rotation.

19. Apparatus means as set forth in claim 15 wherein the beginning of an occurrence of said recurring interval is coincident with the ending of an immediately preceding occurrence of said recurring interval.

20. Apparatus means as set forth in claim 15 wherein said recurring interval, for a four-stroke engine, possesses a measurement equal to 720/N degrees of crankshaft rotation, where N is the number of cylinders of the engine.

21. Apparatus means as set forth in claim 15 wherein said recurring interval has a measurement equal to the number of degrees of crankshaft rotation that correspond to the execution of a single stroke of a piston within a cylinder of the engine.

22. Method for repeatedly updating an ECU of an internal combustion engine with a measurement of the net mass of combustion air entering the engine during each occurrence of a recurring interval which is measured by rotation of a crankshaft of the engine through a number of mechanical degrees which correspond to the execution of a particular stroking of a piston within a cylinder of the engine and within which the combustion air flow is at some times directionally into the engine and at other times directionally out of the engine, said means comprising:

generating, by means of a first sensing means disposed in sensing relation to the combustion air flow, an analog signal measurement of the instantaneous mass flow rate of the passing air flow without distinguishing between flow which is directionally into the engine and flow which is directionally out of the engine;

generating, by means of a second sensing means disposed in relation to said first sensing means and in sensing relation to the combustion air flow, a directional signal which is indicative of whether the instantaneous air flow past said first sensing means is directionally into the engine or directionally out of the engine;

sampling the analog signal measurement provided by said first sensing means at each of a plurality of selected sample occasions during one of said intervals;

accumulating in a single accumulator over said one of said intervals the result of integrating each sample of the analog signal measurement taken over a corresponding segment of said one of said intervals such that when the directional signal of said second sensing means indicates flow that is directionally into the engine, integration is conducted in one sense, and when the directional signal of said second sensing means indicates flow that is directionally out of the engine, the integration is conducted in an opposite sense, said accumulator thereby being caused to contain at any instant of time during said one of said intervals a value representing the net mass of air that has entered the engine so far during said one of said intervals; and providing to the engine ECU, at the conclusion of said one of said intervals, the value contained in said accumulator, namely the accumulated result of the integrations so conducted.

23. Method as set forth in claim 22 wherein said sampling the analog signal measurement provided by said first sensing means at each of a plurality of selected sampling occasions during one of said intervals comprises sampling the analog signal measurement at selected sampling occasions which are at equal increments of crankshaft rotation along said one of said intervals.

24. Method as set forth in claim 23 wherein said sampling the analog signal measurement at selected sampling occasions which are at equal increments along said one of said intervals comprises sampling the analog signal measurement at selected sampling occasions which are at one degree increments of crankshaft rotation along said one of said intervals.

25. Method as set forth in claim 24 wherein said accumulating over said one of said intervals the result of integrating each sample of the analog signal measurement taken over a corresponding segment of said one of said intervals comprises integrating each sample of said analog signal measurement over a segment of one degree of crankshaft rotation.

26. Method as set forth in claim 22 wherein the beginning of an occurrence of said recurring interval is coincident with the ending of an immediately preceding occurrence of said recurring interval.

27. Method as set forth in claim 22 wherein said recurring interval, for a four-stroke engine, possesses a measurement equal to 720/N degrees of crankshaft rotation, where N is the number of cylinders of the engine.

28. Method as set forth in claim 22 wherein said recurring interval has a measurement equal to the number of degrees of crankshaft rotation that correspond to the execution of a single stroke of a piston within a cylinder of the engine.

* * * * *